(12) United States Patent
Shiraki et al.

(10) Patent No.: US 7,330,222 B2
(45) Date of Patent: Feb. 12, 2008

(54) DISPLAY DEVICE AND METHOD FOR FABRICATING THE SAME

(75) Inventors: Ichiro Shiraki, Nara (JP); Mutsumi Nakajima, Nara (JP); Keisuke Yoshida, Nara (JP); Shoichi Andou, Mie (JP); Masayuki Inoue, Mie (JP); Hirofumi Katsuse, Tokyo (JP); Junichi Yamada, Mie (JP)

(73) Assignee: Sharp Kabushiki Kaisha, Osaka-shi (JP)

( * ) Notice: Subject to any disclaimer, the term of this patent is extended or adjusted under 35 U.S.C. 154(b) by 532 days.

(21) Appl. No.: 11/048,885

(22) Filed: Feb. 3, 2005

(65) Prior Publication Data

US 2005/0174500 A1    Aug. 11, 2005

(30) Foreign Application Priority Data

Feb. 5, 2004   (JP)   .............................. 2004-029414
Dec. 2, 2004   (JP)   .............................. 2004-350108

(51) Int. Cl.
*G02F 1/1333*   (2006.01)
*G02F 1/136*    (2006.01)
*G02F 1/1343*   (2006.01)

(52) U.S. Cl. ........................... 349/54; 349/42; 349/38; 349/39

(58) Field of Classification Search ................. 349/54, 349/42, 38, 39
See application file for complete search history.

(56) References Cited

U.S. PATENT DOCUMENTS

| 5,042,916 | A | * | 8/1991 | Ukai et al. ..................... 349/55 |
| 5,132,819 | A | * | 7/1992 | Noriyama et al. ............ 349/55 |
| 5,173,792 | A | * | 12/1992 | Matsueda ..................... 349/54 |
| 5,337,173 | A | * | 8/1994 | Atsumi et al. ................ 349/39 |
| 7,224,032 | B2 | * | 5/2007 | Shiraki et al. .............. 257/347 |
| 7,242,442 | B2 | * | 7/2007 | Nakajima et al. ............ 349/54 |
| 2001/0052889 | A1 | | 12/2001 | Fukunishi |
| 2002/0063844 | A1 | | 5/2002 | Matsuura et al. |

FOREIGN PATENT DOCUMENTS

| CN | 1327167 A | 12/2001 |
| JP | 2-108028 A | 4/1990 |
| JP | 2001-330850 A | 11/2001 |

* cited by examiner

*Primary Examiner*—Mike Qi
(74) *Attorney, Agent, or Firm*—Birch, Stewart, Kolasch & Birch, LLP

(57) ABSTRACT

A display device includes a source line for supplying a display signal, a display pixel electrode, and a TFT for switching an electrical connection between the source line and the pixel electrode. The TFT includes a source electrode electrically connected to the source line, a drain electrode electrically connected to the pixel electrode, and a gate electrode for controlling an electrical connection between the source electrode and the drain electrode. A first auxiliary capacitor electrode and a second auxiliary capacitor electrode are connected to the drain electrode and respective connection portions between the drain electrode and the auxiliary capacitor electrodes are formed of a semiconductor material.

10 Claims, 14 Drawing Sheets

DISPLAY DEVICE AND METHOD FOR FABRICATING THE SAME

CROSS-REFERENCE TO RELATED APPLICATIONS

This Nonprovisional application claims priority under 35 U.S.C. § 119 (a) on Patent Applications No. 2004-29414 filed in Japan on Feb. 5, 2004 and No. 2004-350108 filed in Japan on Dec. 2, 2004, the entire contents of which are hereby incorporated by reference.

BACKGROUND OF THE INVENTION

1. Field of the Invention

The present invention relates to a display device and a method for fabricating the display device, and more particularly relates to a method for repairing a pixel defect.

2. Description of the Prior Art

Liquid crystal display devices are characterized by having a thin body and low power consumption. Utilizing such characteristics, liquid crystal display devices are widely used for personal computer, cellular phones and the like. Specifically, an active matrix type liquid crystal display device including a switching element such as a thin film transistor (which will be hereafter referred to as a "TFT") provided for each pixel (i.e., the smallest image unit) can reliably turn ON each pixel, and thus allows for fine moving picture display.

The liquid crystal display device includes an active matrix substrate in which a plurality of pixel electrodes are arranged in a matrix, a counter substrate provided so as to be opposed to the active matrix substrate and including a common electrode, and a liquid crystal layer interposed between the substrates.

FIG. 14 is a plan view schematically illustrating an active matrix substrate 60 constituting a general liquid crystal display device.

In the active matrix substrate 60, a plurality of gate lines 1 and a plurality of source lines 2 are provided so that the gate lines 1 intersect with the source lines 2 at right angles. TFTs 5 are provided so that each of the TFTs 5 is located at each of intersections of the gate lines 1 and the source lines 2. Capacitor lines 3 are provided so that each of the capacitor lines 3 is located between adjacent ones of the gate lines 1 so as to be parallel to the gate lines 1. Furthermore, pixel electrodes 8 are provided so that each of the pixel electrodes 8 corresponds to one of the TFTs 5 and is located in a display region surrounded with a pair of gate lines 1 and a pair of source lines 2.

A TFT 5 includes a gate electrode G, i.e., a protruding portion of a gate line 1 and a source electrode S, i.e., a protruding portion of a source line 2, and a drain electrode D provided so as to face the source electrode S.

The drain electrode D is extended so as to form a connection line 16 and an auxiliary capacitor electrode 15 and connected to a pixel electrode 8 through a contact hole 15a. Moreover, the auxiliary capacitor electrode 15 and a capacitor line 3 overlap with each other with an insulation film interposed therebetween to form an auxiliary capacitor.

In the liquid crystal display device, when an image is displayed, a gate signal is sent from a predetermined gate line 1 to turn ON a TFT 5 connected to the gate line 1 and at the same time, a source signal is sent from a source line 2 to write predetermined electric charges in a pixel electrode 8 through the source electrode S and the drain electrode D, so that a potential difference is generated between the pixel electrode 8 and a common electrode of the counter substrate and a predetermined voltage is applied to a pixel capacitor formed of a liquid crystal capacitor of a liquid crystal layer and the auxiliary capacitor. A transmittance of incident light from the outside is adjusted by changing an alignment state of liquid crystal molecules forming the liquid crystal layer with the applied voltage to display an image.

In the liquid display device having the above-described structure, a voltage applied during a period in which a TFT is in an ON state has to be stored in a pixel capacitor for a certain amount of time. In many cases, if the pixel capacitor is formed of only a liquid crystal capacitor, the applied voltage is reduced due to a liquid crystal and a leakage current of the TFT to cause an insufficient storage operation or the pixel capacitor is influenced by a parasitic capacitance. Therefore, to suppress reduction in an applied voltage in the pixel capacitor, in addition to the liquid capacitor, an auxiliary capacitor is generally provided so as to be electrically parallel to the liquid crystal capacitor.

A capacity of the auxiliary capacitor can be increased by increasing an area occupied by the capacitor line 3 and the auxiliary capacitor electrode 15 in each display region, reducing the thickness of the insulation film between the capacitor line 3 and the auxiliary capacitor electrode 15 or the like. With the increase in the capacity of the auxiliary capacitor, the storage property of the pixel capacitor can be improved, so that display quality of the liquid crystal display device is increased.

However, if in order to increase the capacity of the auxiliary capacitor, the areas of the capacitor line 3 and the auxiliary capacitor electrode 15 are increased and the thickness of the insulation film therebetween is reduced, the pixel capacitor becomes easily influenced by particles (particulate contaminants), dusts and the like, which can be possibly attached to a substrate surface in process steps for fabricating a liquid crystal display device, so that a short circuit might occur between the capacitor line 3 and the auxiliary capacitor electrode 15. In such a case, a potential of the capacitor line 3 is directly applied to the pixel electrode 8, so that a failure of pixel display, i.e., a defective pixel might be caused at increased possibility.

In a liquid crystal display device having the above-described problems, for example, dotted or linear defects are detected in display inspection. Normally, in a liquid crystal display device, a predetermined number of dotted defects or less are acceptable. However, if the number of defects is increased, the liquid display device is judged to be a defect.

Therefore, conventionally, techniques for repairing such dotted defective pixels have been proposed and put into use in fabrication of a liquid crystal display device.

For example, Japanese Laid-Open Publication No. 2-108028 describes an example in which an auxiliary capacitor is formed between a capacitor line and a pixel electrode. In Japanese Laid-Open Publication No. 2-108028, disclosed is an active matrix substrate in which a plurality of protruding potions are provided in a capacitor line in advance so that the protruding potions intersect with the capacitor line with right angles and which is so configured that when a short circuit occurs between any one of the plurality of protruding portions and a pixel electrode, laser is irradiated to a base portion (connection portion) of the protruding portion corresponding to part in which the short circuit has occurred to cut off the connection portion for defect repair.

Moreover, Japanese Laid-Open Publication No. 2001-330850 describes an example in which an auxiliary capacitor is formed between a capacitor line and an auxiliary capacitor electrode. In Japanese Laid-Open Publication No. 2001-330850, disclosed is a liquid crystal display device in which an auxiliary capacitor electrode is divided into a plurality of regions in advance and the regions are connected with one another by connection portions each having a shape to allow defect repair in a simple manner and which is so configured that when a short circuit occurs between any one of the plurality of regions of the auxiliary capacitor electrode and a capacitor line, laser is irradiated to a connection portion corresponding to part in which the short circuit has occurred to cut off the connection portion for defect repair.

In each of Japanese Laid-Open Publication No. 2-108028 and In Japanese Laid-Open Publication No. 2001-330850, when a short circuit occurs in the auxiliary capacitor electrode, laser is irradiated to a metal thin film forming the capacitor line and a metal thin film made of the same material as that for a drain electrode and forming the auxiliary capacitor electrode to cut off the connection portion.

However, to form interconnects and electrodes with excellent conductivity, the thickness of the metal thin film forming the connection portion has to be large. With a large thickness, the metal film can not be cut off in a simple manner and thus the pixel electrode, a common electrode of a counter substrate and the like might be damaged by the cut off. Furthermore, in a liquid crystal display device with interconnects and TFTs whose sizes have been reduced more and more, an interconnect pattern and the like in the periphery of the metal thin film might be damaged by cutting off the metal thin film of the connection portion.

SUMMARY OF THE INVENTION

In view of the above-described points, the present invention has been devised and it is therefore an object of the present invention to provide a display device which allows repair of a display failure due to a short circuit defect of an auxiliary capacitor electrode in a simple manner and a method for fabricating the display device (defect repair method).

A display device according to the present invention is characterized in that the display device includes: a source line for supplying a display signal; a display pixel electrode; and a switching element for switching an electrical connection between the source line and the display pixel electrode, the switching element includes a source electrode electrically connected to the source line, a drain electrode electrically connected to the pixel electrode, a gate electrode for controlling an electrical connection between the source electrode and the drain electrode, the display device further includes a plurality of auxiliary capacitor electrodes connected to the drain electrode and connection portions are formed of a semiconductor material, each being provided between the drain electrode and each of the plurality of auxiliary capacitor electrodes.

With the above-described structure, the connection portions each of which is provided between the drain electrode of the switching element and each of the plurality of auxiliary capacitor electrodes are formed of a semiconductor material. Thus, if the connection portions formed of a semiconductor material are cut off, the cutoff can be performed in a more simple manner than in the case where connection portions are formed of a metal thin film as in the known manner. Therefore, a display failure due to a short circuit of an auxiliary capacitor electrode can be repaired in a simple manner. Furthermore, for example, the intensity of laser beam irradiated for cutoff can be suppressed to be a low level. Therefore, damages of an interconnect pattern in the vicinity of part to which laser beam is irradiated can be reduced.

The display device may further include: an extended electrode electrically connected to the drain electrode and each of the connection portions may be formed so as to have a smaller thickness than the thickness of the extended electrode.

With the above-described structure, because each of the connection portions is formed so as to have a smaller thickness than the thickness of the extended electrode, the connection portions can be cut off in a simple manner. Thus, a display failure due to a short circuit defect of an auxiliary capacitor electrode can be repaired in a simple manner. Furthermore, because repair of a display failure in a simple manner is allowed, for example, the intensity of laser beam irradiated for cutoff can be suppressed to be a low level. Therefore, damages of an interconnect pattern in the vicinity of part to which laser beam is irradiated can be reduced.

The drain electrode, the plurality of auxiliary capacitor electrodes, and the connection portions each of which is provided between the drain electrode and each of the plurality of auxiliary capacitor electrodes may be formed in a same semiconductor film.

With the above-described structure, because the drain electrode, the plurality of auxiliary capacitor electrodes, and the connection portions each of which is provided between the drain electrode and each of the plurality of auxiliary capacitor electrodes are formed in a same semiconductor film, the connection portions can be formed simultaneously to the drain electrode and the plurality of auxiliary capacitor electrodes. Thus, the connection portions can be formed without increasing the number of process steps and process steps for fabricating a display device can be simplified.

The switching element may be provided on an insulation substrate and the connection portions may be provided so as to be closer to the insulation substrate than to the gate electrode.

With the above-described structure, the connection portions each of which is provided between the drain electrode and each of the plurality of auxiliary capacitor electrodes are located closer to the insulation substrate than to the gate electrode. Thus, by irradiating laser beam to each of the connection portions from part thereof closer to the insulation substrate, the connection portions can be cut off in a simple manner without damaging some other interconnect pattern in the vicinity of part to which laser beam is irradiated.

The connection portions and the pixel electrode may be formed in different layers, and a protection layer may be provided between each of the connection portions and the pixel electrode so as to overlap with each of the connection portions.

With the above-described structure, the protection layer is provided so as to overlap with each of the connection portions. Thus, when laser beam is irradiated to each of the connection portions from part thereof closer to the insulation substrate, damages given to a pixel electrode can be reduced by the protection film. Moreover, the protection layer is provided in a region to which laser beam missing a connection portion, i.e., an irradiation target, might be irradiated by mistake. Thus, even if irradiated laser beam misses the connection portions, the laser beam is shielded by the protection layer, so that peripheral members are less damaged. Therefore, the connection portions can be cut off in a simple manner without damaging some other member in the vicinity of part to which laser beam is irradiated.

The protection layer may be formed of a material used for forming the source line or the gate electrode.

With the above-described structure, a protection layer can be formed between the connection portions and the pixel electrode without adding an addition process step.

The connection portions may include a first connection section and second connection sections, the first connection section being connected to the drain electrode, each of the second connection sections being branched from the first connection section and connected to each of the auxiliary capacitor electrodes.

With the above-described structure, for example, when short circuit defects occur in all of auxiliary capacitor electrodes in a pixel and all of electrical connections with the drain electrode corresponding to the auxiliary capacitor electrodes has to be removed, it is not required to cut off each of the second connection sections for connecting the drain electrode and the auxiliary capacitor electrodes but it is required to cut off only the first connection section, i.e., a branch base of the second connection sections. Thus, damages of an interconnect pattern in the vicinity of part to which laser beam for cutoff is irradiated can be reduced. Moreover, cut-off by laser beam is performed only once and thus the number of process steps required for defect repair is reduced.

A display device according to the present invention is characterized in that the display device includes: a source line for supplying a display signal; a display pixel electrode; and a switching element for switching an electrical connection between the source line and the display pixel electrode, the switching element includes a source electrode electrically connected to the source line, a drain electrode electrically connected to the pixel electrode, and a gate electrode for controlling an electrical connection between the source electrode and the drain electrode, the display device further includes a plurality of auxiliary capacitor electrodes connected to the drain electrode, connection portions are formed of a semiconductor material, each of the connection portions being provided between the drain electrode and each of the plurality of auxiliary capacitor electrodes, and one of the connection portions is cut off.

With the above-described structure, one of the connection portions each of which is provided between the drain electrode and each the plurality of auxiliary capacitor electrodes is cut off and an electrical connection between an auxiliary capacitor electrode and the corresponding drain electrode is removed, so that a display failure due to a short circuit defect of an auxiliary capacitor electrode of the display device is repaired. Moreover, an auxiliary capacitor is formed of some other auxiliary capacitor electrode of which a connection portion is not cut off, so that reduction in a pixel capacitance of a pixel electrode can be suppressed. Therefore, the repaired display device can perform nearly normal display.

A display device according to the present invention is characterized in that the display device includes: a source line for supplying a display signal; a display pixel electrode; and a switching element for switching an electrical connection between the source line and the display pixel electrode, the switching element includes a source electrode electrically connected to the source line, a drain electrode electrically connected to the pixel electrode, and a gate electrode for controlling an electrical connection between the source electrode and the drain electrode, the display device further includes a plurality of auxiliary capacitor electrodes connected to the drain electrode and connection portions are formed of a semiconductor material, each of the connection portions being provided between the drain electrode and each of the plurality of auxiliary capacitor electrodes, the connection portions include a first connection section and second connection sections, the first connection section being connected to the drain electrode, each of the second connection portions being branched from the first connection portion and connected to each of the auxiliary capacitor electrodes, a plurality of pixels each of which is defined by the pixel electrode are provided, one of the pixels is a defective pixel due to a short circuit defect in the plurality of auxiliary capacitor electrodes, and in the defective pixel, the first connection section is cut off.

With the above-described structure, in the defective pixel in which a defect is generated due to a short circuit in the plurality of auxiliary capacitor electrodes, the first connection section between the drain electrode and one of the plurality of auxiliary capacitor electrodes is cut off, so that all of electrical connections between the plurality of auxiliary capacitor electrodes and the corresponding drain electrode is removed and a display failure due to a short circuit defect in an auxiliary capacitor electrode is repaired. Therefore, when short circuit defects occur in all of auxiliary capacitor electrodes in a pixel and all of electrical connections between the auxiliary capacitor electrodes and the corresponding drain electrode has to be removed, a display device can be repaired to be in a nearly normal state by cutting off only the corresponding first connection section.

A method for fabricating a display device which includes a source line for supplying a display signal, a display pixel electrode, and a switching element for switching an electrical connection between the source line and the display pixel electrode and in which the switching element includes a source electrode electrically connected to the source line, a drain electrode electrically connected to the pixel electrode, and a gate electrode for controlling an electrical connection between the source electrode and the drain electrode, the display device further includes a plurality of auxiliary capacitor electrodes connected to the drain electrode and connection portions are formed of a semiconductor material, each of the connection portions being provided between the drain electrode and each of the plurality of auxiliary capacitor electrodes, is characterized by including: a defect detection step of detecting from the plurality of auxiliary capacitor electrode an auxiliary capacitor electrode in which a short circuit defect has occurred; and a defect repair step of cutting a connection portion between the auxiliary capacitor electrode detected in the defect detection step and the drain electrode.

According to the above-described method, by detecting from a plurality of auxiliary capacitor electrodes an auxiliary capacitor electrode in which a short circuit defect has occurred and cutting off a connection portion between the auxiliary capacitor electrode and a drain electrode, an electrical connection between the auxiliary capacitor electrode in which a short circuit has occurred and the drain electrode is removed, so that a display failure due to a short circuit defect of the auxiliary capacitor electrode of the display device can be repaired. Then, if an auxiliary capacitor is formed of some other auxiliary capacitor electrode of which a connection portion is not cut off, reduction in the capacity of a pixel formed of a pixel electrode can be suppressed. Thus, a repaired display device can perform display in a nearly normal state. Furthermore, a display device including an auxiliary capacitor electrode in which a short circuit has occurred can be repaired to be in a state where a nearly normal display can be performed, and therefore, a yield of a display device can be improved.

DESCRIPTION OF THE PREFERRED EMBODIMENTS

Hereafter, embodiments of the present invention will be described in detail with reference to the accompanying drawings. In the following embodiments, description will be given with a liquid crystal display device using a TFT as a switching element taken as an example. However, the present invention is not limited to the following embodiments but may have some other structure.

Embodiment 1

Hereafter, a liquid crystal display device 50 according to Embodiment 1 of the present invention will be described.

Figure 1:
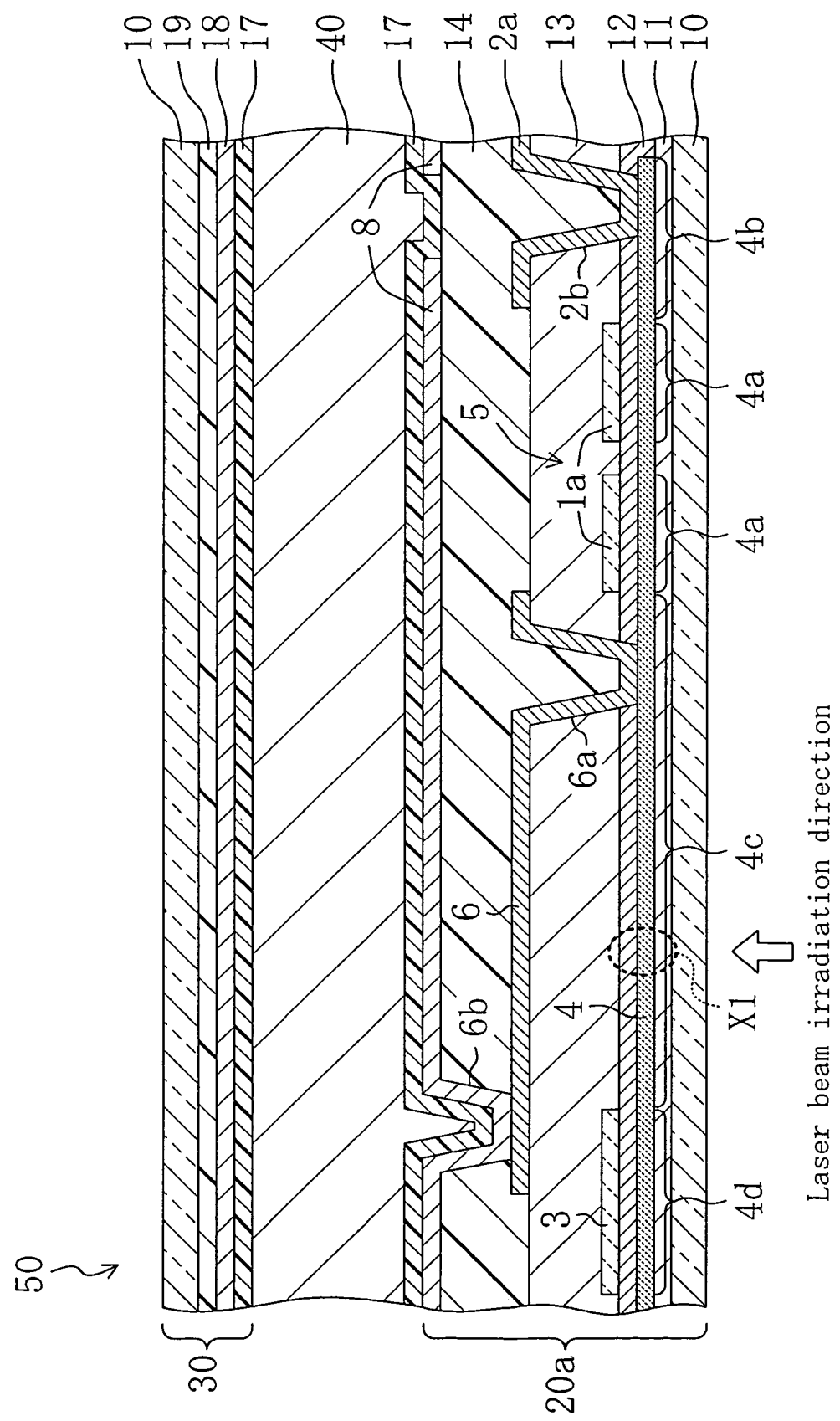
FIG. 1 is a cross-sectional view schematically illustrating a liquid crystal display device 50 according to Embodiment 1 of the present invention.
Figure 2:
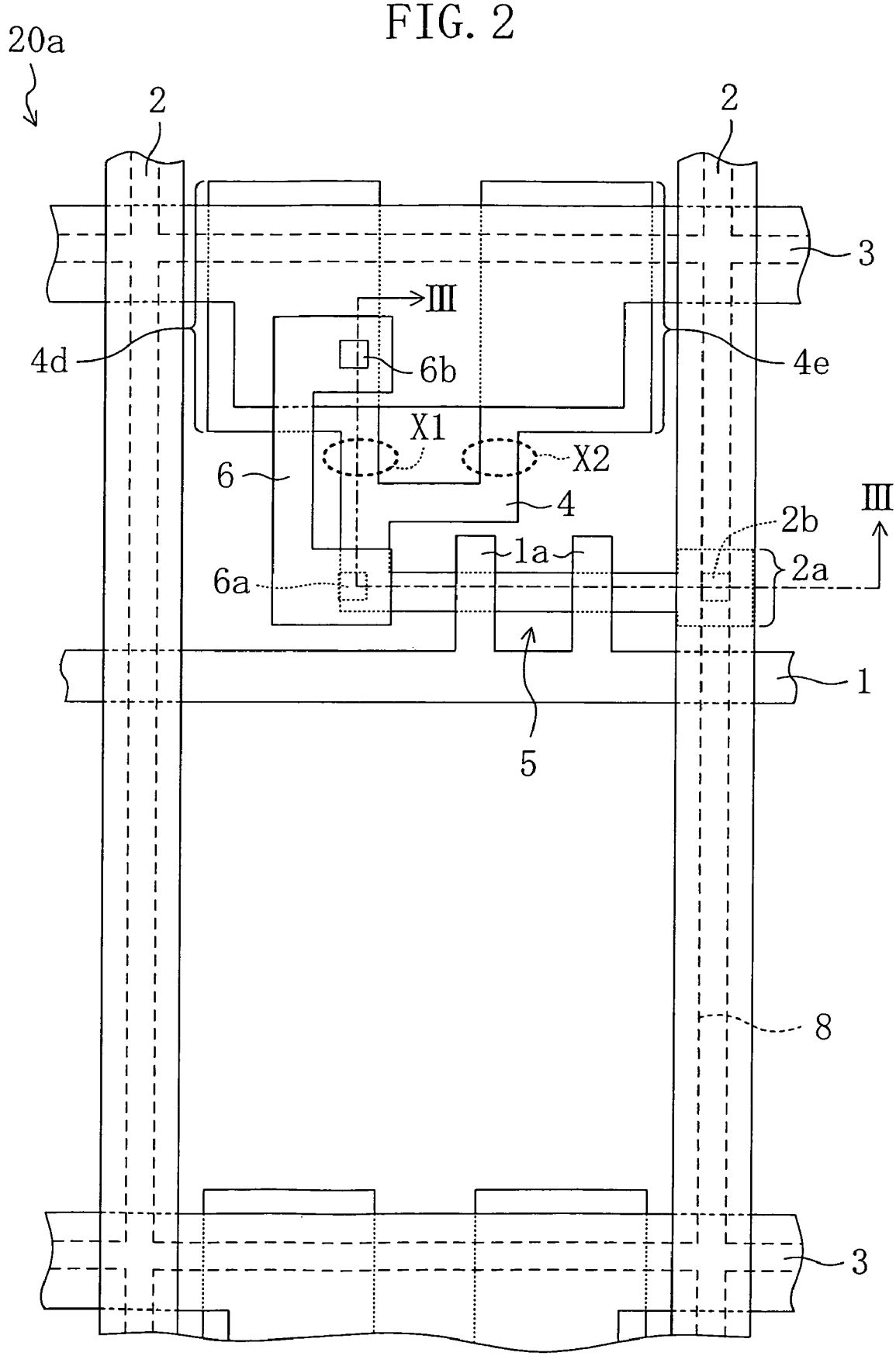
FIG. 2 is a plan view schematically illustrating an active matrix substrate 20a according to Embodiment 1 of the present invention.
Figure 3:
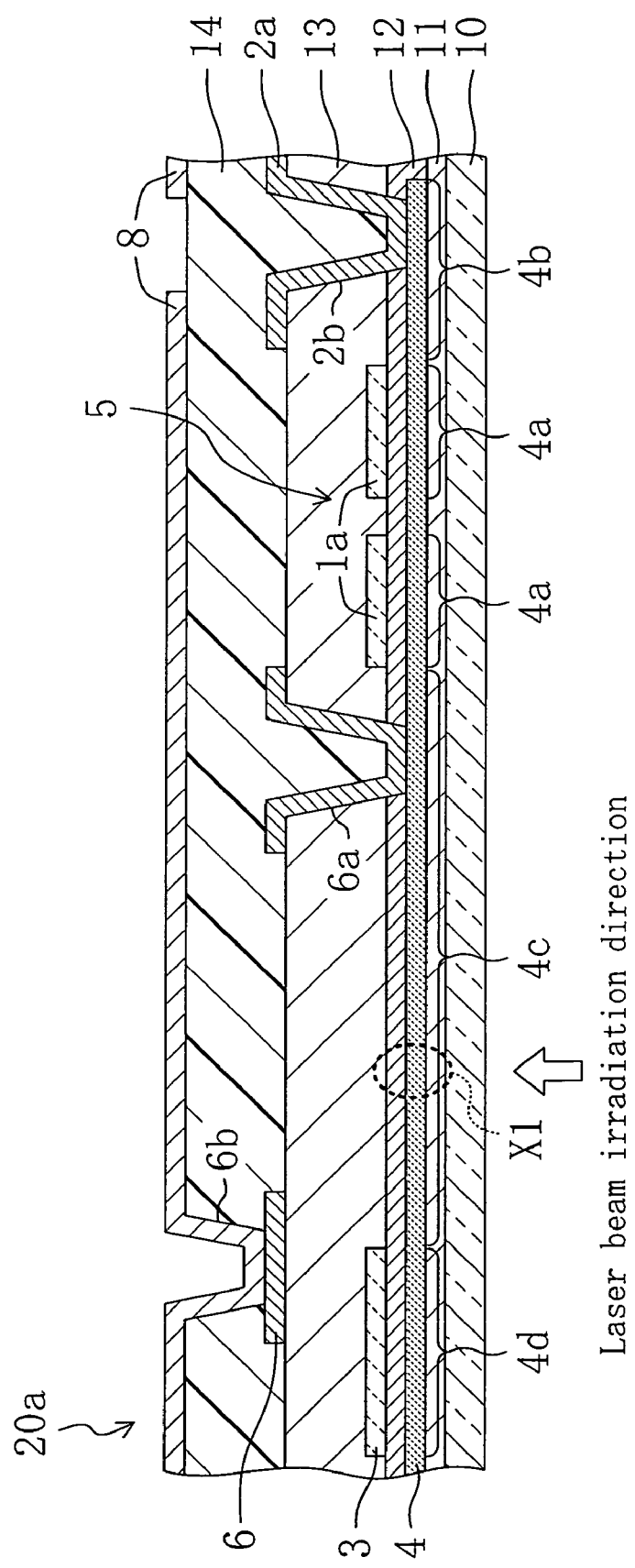
FIG. 3 is a cross-sectional view schematically illustrating the active matrix substrate 20a (before defect repair) of Embodiment 1 of the present invention and corresponds to a cross section taken along the line III-III of FIG. 2.

FIG. 1 is a cross-sectional view schematically illustrating the liquid crystal display device 50. FIG. 2 is a plan view schematically illustrating an active matrix substrate 20a constituting the liquid crystal display device 50. FIG. 3 is a cross-sectional view schematically illustrating a cross section taken along the line III-III.

The liquid crystal display device 50 includes an active matrix substrate 20a, a counter substrate 30 provided so as to be opposed to the active matrix substrate 20a, and a liquid crystal layer 40 provided so as to be interposed between the substrates 20a and 30.

In the active matrix substrate 20a, a plurality of gate lines 1 are provided so as to extend in parallel to one another, and a plurality of source lines 2 are provided so as to extend in the direction intersecting with the gate lines 1 with right angles. TFTs 5 are provided at intersections of the gate lines 1 and the source lines 2, respectively. Capacitor lines 3 are provided so that each of the capacitor lines 3 extends between adjacent ones of the gate lines 1 and in parallel to the gate electrodes 1. Moreover, pixel electrodes 8, each corresponding to an associated one of the TFTs 5 and forming a pixel, are provided so that each of the pixel electrodes 8 is located in each display region surrounded by a pair of gate lines 1 and a pair of source lines 2.

Moreover, the active matrix substrate 20a has a multilayer stack structure in which a base coating film 11, a gate insulation film 12 and an interlayer insulation film 13 and a resin layer 14 are stacked in this order on an insulation substrate 10.

A semiconductor film 4 including channel regions 4a, a source electrode 4b, a drain electrode 4c, a first auxiliary capacitor electrode 4d and a second auxiliary capacitor electrode 4e is provided between the base coating film 11 and the gate insulation film 12.

Between the gate insulation film 12 and the interlayer insulation film 13, a gate line 1, a gate electrode 1a, i.e., a protruding portion of the gate line 1, and a capacitor line 3 are provided.

Between the interlayer insulation film 13 and the resin layer 14, a source electrode extended electrode 2a which is connected to the source electrode 4b through a contact hole 2b and is also part of the source line 2 and a drain electrode extended electrode 6 connected to the drain electrode 4c through a contact hole 6a are provided.

Pixel electrodes 8 are provided on the resin layer 14 so as to be connected to the drain electrode extended electrode 6 through a contact hole 6b, and an alignment film 17 is provided over the pixel electrodes 8.

A TFT 5 includes two gate electrodes 1a and has a multi-gate TFT structure in which a plurality of gate electrodes are provided in a TFT. Thus, an OFF current can be reduced. Also, assume that there is continuity in one of transistor sections (the gate electrodes) forming a TFT at all the time. If the other one of the transistor sections (the gate electrodes) is in a normal state, fatal property defects of the multi-gate TFT itself can be avoided.

Each of auxiliary electrodes formed of the first auxiliary capacitor electrode 4d and the second auxiliary capacitor electrode 4e, respectively, overlaps with the capacitor line 3 with the gate insulation film 12 interposed therebetween to form an auxiliary capacitor.

Moreover, each of the first auxiliary capacitor electrode 4d and the second auxiliary capacitor electrode 4e is formed by extending the drain electrode 4c of the semiconductor film 4. Thus, each of the first auxiliary capacitor electrode 4d and the second auxiliary capacitor electrode 4e is formed of the same material as that of the semiconductor film 4 and is electrically connected with the drain electrode 4c.

Accordingly, the drain electrode 4c, the first auxiliary capacitor electrode 4d, the second auxiliary capacitor electrode 4e, and connection portions between the drain electrode 4c and the auxiliary capacitor electrodes 4d and between the drain electrode 4c and the second auxiliary capacitor electrode 4e are formed of the semiconductor film 4. Thus, the connection portions between the drain electrode 4c, the auxiliary capacitor electrodes 4d and the second auxiliary capacitor electrode 4e can be formed simultaneously with the drain electrode 4c and the plurality of auxiliary capacitor electrodes. Therefore, the connection portions can be formed without increasing the number of process steps, and process steps can be simplified in fabricating a liquid crystal display device.

Furthermore, the first auxiliary capacitor electrode 4d and the second auxiliary capacitor electrode 4e may be formed of some other conductive thin film than a semiconductor film so that only connection portions of the drain electrode 4c with the auxiliary capacitor electrodes 4d and 4e are formed of a semiconductor material. Moreover, in this embodiment, the auxiliary capacitor electrode including the two auxiliary capacitor electrodes 4d and 4e has been described as an example. However, an auxiliary capacitor electrode including three or more auxiliary capacitor electrodes may be used.

The counter substrate 30 has a multilayer stack structure in which a color filter layer 19, an over coating layer (not shown), a common electrode 18 and an alignment film 17 are stacked in this order on an insulation substrate 10.

As for the color filter layer 19, a colored layer of red, green or blue is provided so as to correspond to each pixel. A black matrix is provided as a light shielding film between adjacent ones of colored layers.

The liquid crystal layer 40 is formed of a nematic liquid crystal material having electrooptic properties.

In the liquid crystal display device 50, each pixel electrode 8 forms a pixel. In each pixel, when a gate signal is sent from a gate line 1 to turn ON a TFT 5, a source signal is sent from a source line 2 and predetermined electric charges are written in each of the pixel electrode 8 and the auxiliary capacitor electrodes 4d and 4e through the source electrode 4b and the drain electrode 4c, so that a potential difference is generated between the pixel electrode 8 and the auxiliary capacitor electrode 4d and between the pixel electrode 8 and the auxiliary capacitor electrode 4e. Accordingly, a predetermined voltage is applied to each of a liquid crystal capacitor of the liquid crystal layer 40 and auxiliary capacitors between the capacitor line 3 and the auxiliary capacitor electrode 4d and between the capacitor line 3 and the auxiliary capacitor electrode 4e. In the liquid crystal display device 50, a transmittance of incident light from the outside is adjusted by using change in an alignment state of liquid crystal molecules which according to the level of the applied voltage, so that an image is displayed.

Next, a method for fabricating a liquid crystal display device 50 according to an embodiment of the present invention will be described.

<Process Step of Forming Active Matrix Substrate>

Hereafter, a method for forming an active matrix substrate will be described with reference to the schematic plan view of FIG. 2 and the schematic cross-sectional view of FIG. 3.

First, a SiON film (having a thickness of about 100 nm) is formed over a glass substrate 10 by plasma CVD (chemical vapor deposition), thereby forming a base coating film 11.

Next, an amorphous silicon film (having a thickness of about 50 nm) is formed over the base coating film 11 by plasma CVD using disilane ($Si_2H_6$) as a source gas. Then, heat treatment is performed to crystallize the amorphous silicon film (to change the amorphous film into a polysilicon film). Thereafter, a pattern is formed by photo engraving process (which will be hereafter referred to as the "PEP technology") to form a semiconductor film 4.

Next, a SiON film (having a thickness of about 115 nm) is formed by plasma CVD over the base coating film 11 on which the semiconductor film 4 is formed, thereby forming a gate insulation film 12.

Next, a tantalum nitride film (having a thickness of about 50 nm) and a tungsten film (having a thickness of about 370 nm) are formed in this order over the gate insulation film 12 by sputtering. Thereafter, pattern formation is performed by the PEP technology to form a gate line 1, gate electrodes 1a and a capacitor line 3. Note that, instead of a lamination film of the tantalum film and the tungsten film, a single element material of a metal element selected from a group consisting of tantalum, tungsten, titanium, molybdenum, aluminum and copper or an alloy or compound material containing the metal element may be used.

Next, the semiconductor film 4 is doped with phosphorus through the gate insulation film 12 using the gate electrodes 1a as a mask to form channel regions in parts corresponding to the gate electrodes 1a and a source electrode 4b and a drain electrode 4c (a first auxiliary capacitor electrode 4d and a second auxiliary capacitor electrode 4e) in outer sides of the channel regions 4a, respectively. Thereafter, heat treatment is performed to activate doped phosphorus. Note that when phosphorus is doped as an impurity, an n-channel TFT is formed, and when boron is doped, a p-channel TFT is formed.

Next, a lamination film (having a thickness of about 950 nm) of a silicon nitride film and a silicon oxide film is formed by CVD over the gate insulation film in which the gate line 1, the gate electrodes 1a and the capacitor line 3 are formed, thereby forming an interlayer insulation film 13.

Next, parts of the lamination film of the gate insulation film 12 and the interlayer insulation film 13 corresponding to the source electrode 4b and the drain electrode 4c are removed by etching to form contact holes 6a and 2b.

Next, a titanium film (having a thickness of about 100 nm), an aluminum film (having a thickness of about 500 nm) and a titanium film (having a thickness of about 100 m) are formed in this order over the interlayer insulation film 13 by sputtering. Thereafter, pattern formation is performed by the PEP technology to form a source electrode extended electrode 2a, a source line 2 and a drain electrode extended electrode 6.

Next, heat treatment is performed to hydrogenate the semiconductor film 4, so that dangling bonds thereof are terminated.

Next, an organic insulation material such as acrylic resin is applied over the interlayer insulation film 13 on which the source electrode extended electrode 2a, the source line 2 and the drain electrode extended electrode 6 are formed to a thickness of about 1.6 µm, thereby forming a resin layer 14.

Next, part of the resin layer 14 corresponding to the drain electrode extended electrode 6 is removed by etching to form a contact hole 6b.

Next, an ITO (indium tin oxide) film is formed over the resin layer 14 so as to have a thickness of about 100 nm. Thereafter, pattern formation is performed by the PEP technology to form pixel electrodes 8.

Through the above-described manner, the active matrix substrate 20a constituting a display device according to the present invention can be formed. Furthermore, after formation of the active matrix substrate 20a, a thin film of polyimide base resin is formed by printing, and then alignment treatment is performed to a surface of the polyimide base resin thin film by rubbing to form an alignment film 17.

<Process Step of Forming Counter Substrate>

Hereafter, formation of a counter substrate will be described.

First, a chromium film is formed over a glass substrate 10 so as to have a thickness of about 100 nm. Then, pattern formation is performed by the PEP technology to form black matrixes.

Next, pattern formation is performed to form colored layers so that each color layer is red, green or blue, has a thickness of about 2 μm and is located between adjacent two black matrixes. Thus, color filter layers 19 are formed.

Next, an acrylic resin is applied over the color filter layers 19 to a thickness of about 1 μm to form an over coating layer.

Next, an ITO film is formed over the over coating layer to a thickness of about 100 nm to form a common electrode 18.

Next, a thin film of polyimide base resin is formed by printing. Then, by rubbing, alignment treatment is performed to a surface of the polyimide base resin thin film to form an alignment film 17.

Through the above-described manner, the counter substrate 30 constituting a display device according to the present invention can be formed.

<Process Step of Forming Liquid Crystal Display Device>

A sealing portion made of thermosetting resin is formed by printing over an active matrix substrate 20a. Then, spherical spacers are scattered in a side thereof an alignment film and a counter substrate 30 is sealed to the active matrix substrate 20a. Thereafter, a liquid crystal material is injected to and sealed in between the substrates 20a and 30 by decompression, thereby forming a liquid crystal layer 40.

In the above-described manner, the liquid crystal display device 50 of the present invention can be fabricated.

Normally, in the liquid crystal display device 50, a pixel electrode 8 is driven by a TFT 5. As long as the TFT 5 and an auxiliary capacitor normally function and a predetermined potential is applied to and stored in the pixel electrode and the auxiliary capacitor, a transmittance according to the predetermined potential can be obtained as described above and no problem in displaying images occurs. However, if a short circuit occurs between the auxiliary capacitor electrode 4d or 4e and the capacitor line 3, the potential of the capacitor line 3 is applied to the pixel electrode 8 through the part in which the short circuit has occurred and the auxiliary capacitor electrode 4d or 4e, so that a predetermined potential can not be maintained. Thus, a transmittance according to the predetermined potential can not be obtained. Therefore, in a inspection step, a corresponding pixel appears as defective pixels, so that a display failure is found.

Next, a defect repair method in the liquid crystal display device 50 will be described.

Figure 4:
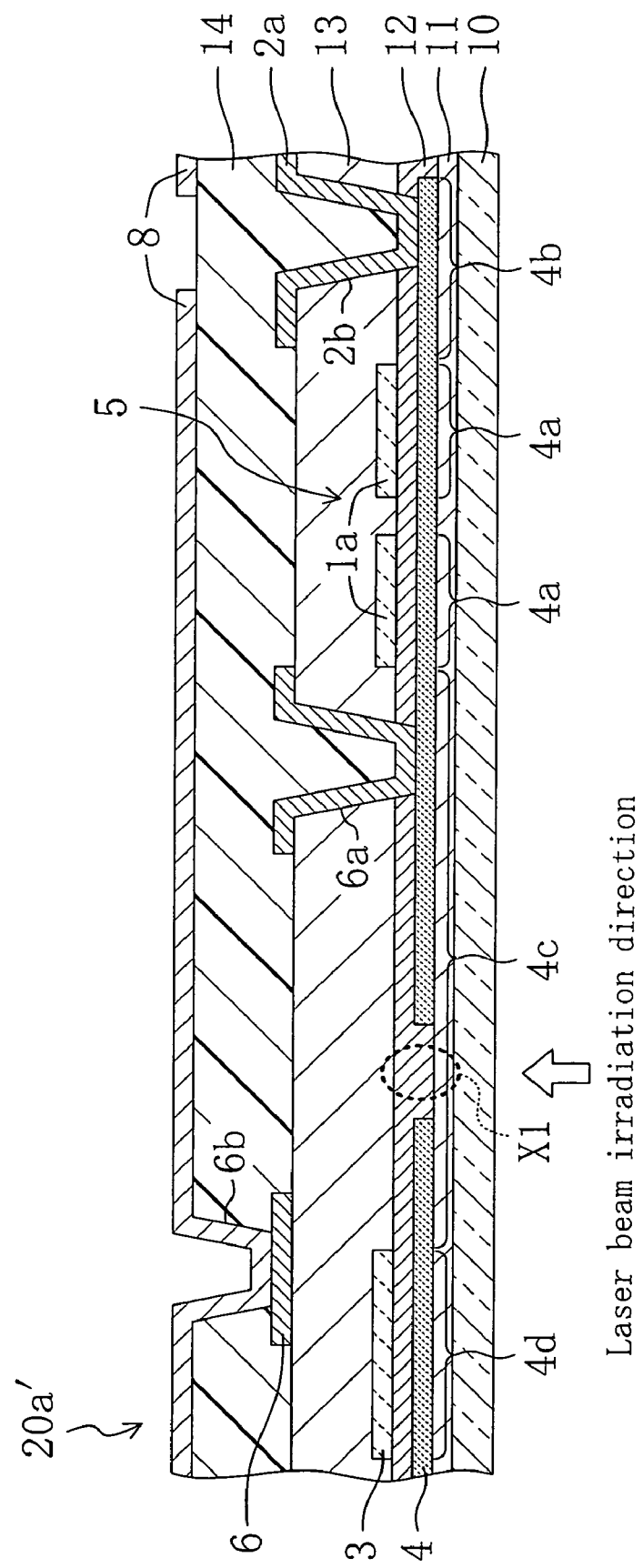
FIG. 4 is a cross-sectional view schematically illustrating an active matrix substrate 20a' (after defect repair) of Embodiment 1 of the present invention.

FIG. 4 is a cross-sectional view schematically illustrating an active matrix substrate 20a' constituting a liquid crystal display device after defect repair and corresponds to the schematic cross-sectional view of FIG. 3.

<Process Step of Defect Detection>

For example, a gate inspection signal of which a bias voltage is −10 V, a period is 16.7 msec, a pulse width is 50 μsec and a pulse voltage is +15 V is input to the gate lines 1 to turn ON all of the first TFTs 5a. Furthermore, a source inspection signal having a potential of ±2 V of which polarity is reversed every 16.7 msec is input to write electric charges corresponding to ±2 V in the pixel electrode 8 through the source electrode 4b and the drain electrode 4c of each TFT 5. At the same time, a common electrode inspection signal, i.e., a direct current at a potential of −1 V is input to the common electrode 18. Thus, a voltage is applied to a liquid crystal capacitor formed between the pixel electrode 8 and the common electrode 18, so that a pixel formed of the pixel electrode 8 is turned ON, and in a normally white mode (i.e., a white display when a voltage is not applied), a white display is changed to a black display.

In this case, in a pixel including an auxiliary capacitor electrode in which a short circuit has occurred, predetermined electric charges can not be written in the pixel electrode 8, so that the pixel is in an OFF state (a luminescent spot).

Thus, the location of a pixel including an auxiliary in which a short circuit has occurred can be specified.

Moreover, in the case of a driver monolithic substrate in which a source line driving circuit and a gate line driving circuit are formed on the same active matrix substrate, each drive signal (a clock, start pulse, video signal or the like) for a normal display state is supplied to each driving circuit to specify an OFF (luminescent spot) pixel as described above.

<Process Step of Defect Repair>

In this embodiment, description is made on the assumption that a short circuit occurs between the first auxiliary capacitor electrode 4d and the capacitor line 3 and the first auxiliary capacitor electrode 4d can not be used.

As shown in FIG. 4, laser beam is irradiated to a cut-off portion X1 of the semiconductor film 4 corresponding to the auxiliary capacitor electrode 4d of a defective pixel detected in the defect detection process step from a side of the cut-off portion closer to the glass substrate 10 to remove a thin film of the semiconductor film 4 and cut off the drain electrode 4c and the first auxiliary capacitor electrode 4d of the semiconductor film 4, so that an electrical connection between the first auxiliary capacitor electrode 4d and the TFT 5 is removed.

In this case, a connection portion between the first auxiliary capacitor electrode 4d and the drain electrode 4c is formed of the semiconductor film 4 having a smaller thickness (i.e., a thickness of about 50 nm in the above-described example) than the thickness of the drain electrode extended electrode 6 (i.e., a thickness of about 700 nm in the above-described example). Thus, the connection portion can be cut in a more simple manner than a connection portion formed of a metal thin film (drain electrode extended electrode or the like) in a known manner, so that the pixel electrode, the common electrode of the counter substrate and the like are less likely damaged.

Moreover, the semiconductor film 4 forming the connection potion between the first auxiliary capacitor electrode 4d and the drain electrode 4c is provided in part closer to the insulation substrate 10 than to the gate electrodes 1a. Thus, an interconnect pattern does not exist between the semiconductor film 4 and the insulation substrate 10. Therefore, the connection portion can be cut off in a simple manner without damaging other interconnect patterns by irradiating laser beam to the connection portion from a side thereof closer to the insulation substrate.

Furthermore, the cut-off portion can be cut off in a simple manner as described above and thus, for example, the intensity of laser beam irradiated for cutoff can be suppressed at a lower level. Therefore, damages of an interconnect in the vicinity of part to which laser beam is irradiated can be reduced.

In the above-described manner, a display failure due to a short circuit defect of an auxiliary capacitor electrode can be repaired in a simple manner.

Note that when a short circuit occurs between the second auxiliary capacitor electrode 4e and the capacitor line 3, laser beam is irradiated to a cut-off portion X2. Moreover, a cross-sectional structure in the cutoff portion X2 is substantially the same as the cross-sectional structure shown in the schematic cross-sectional view of FIG. 4 only except that the drain electrode extended electrode-pixel electrode contact hole 6b does not exist on the drain electrode extended electrode 6.

In this case, irradiation of laser beam will be described. In the following description, a typical example will be shown. However, the present invention is not be limited thereto.

Laser Beam

As laser beam, YAG laser is used. A laser intensity is confirmed by a laser power measuring instrument and then adjusted to be an appropriate intensity using a filter such as an attenuator (fixed optical attenuator).

-Alignment of Irradiation Location-

Laser irradiation areas are set for interconnect patterns in advance and each of the irradiation areas is aligned with each pattern. Then, laser beam adjusted in the above-described manner is irradiated.

For example, laser beam is irradiated to the above-described cutoff portions X1 and X2 at a spot size of 4 μm×8 μm.

In the above-described manner, in the liquid crystal display device 50, a defective pixel caused by the auxiliary capacitor electrode 4d in which a short circuit has occurred can be repaired.

Assume that the liquid crystal in which the above-described defect repair process steps have been completed displays an image. In a repaired pixel, when a gate signal is sent from the gate line 1 to turn ON the TFT 5, a source signal is sent from the source line 2 to write predetermined electric charges in the pixel electrode 8 and the second auxiliary capacitor electrode 4e through the source electrode 4b and the drain electrode 4c, so that a potential difference is generated between the common electrode 18 and each of the pixel electrode 8 and the second auxiliary capacitor electrode 4e. Thus, a predetermined voltage is applied to each of the liquid crystal capacitor made of the liquid crystal layer 40 and the auxiliary capacitor between the second auxiliary capacitor electrode 4e and the capacitor line 3.

Accordingly, in a pixel with a defect repaired, the first capacitor electrode 4d in which a short circuit has occurred is left out and an auxiliary capacitor electrode is formed of only the second auxiliary capacitor electrode 4e. Therefore, with the auxiliary capacitor including the second auxiliary capacitor electrode 4e, reduction in the capacity of a pixel formed of the pixel electrode 8 can be suppressed, so that a repaired liquid crystal display device can perform display in a nearly normal state. Furthermore, a liquid crystal display device including an auxiliary capacitor electrode in which a short circuit has occurred can be repaired so as to be in a state where the liquid crystal display device can perform substantially normal display, and thus a yield of the liquid crystal display device can be improved.

Embodiment 2

A liquid crystal display device according to the present invention may be formed so as to have the following structure for Embodiment 1.

Figure 5:
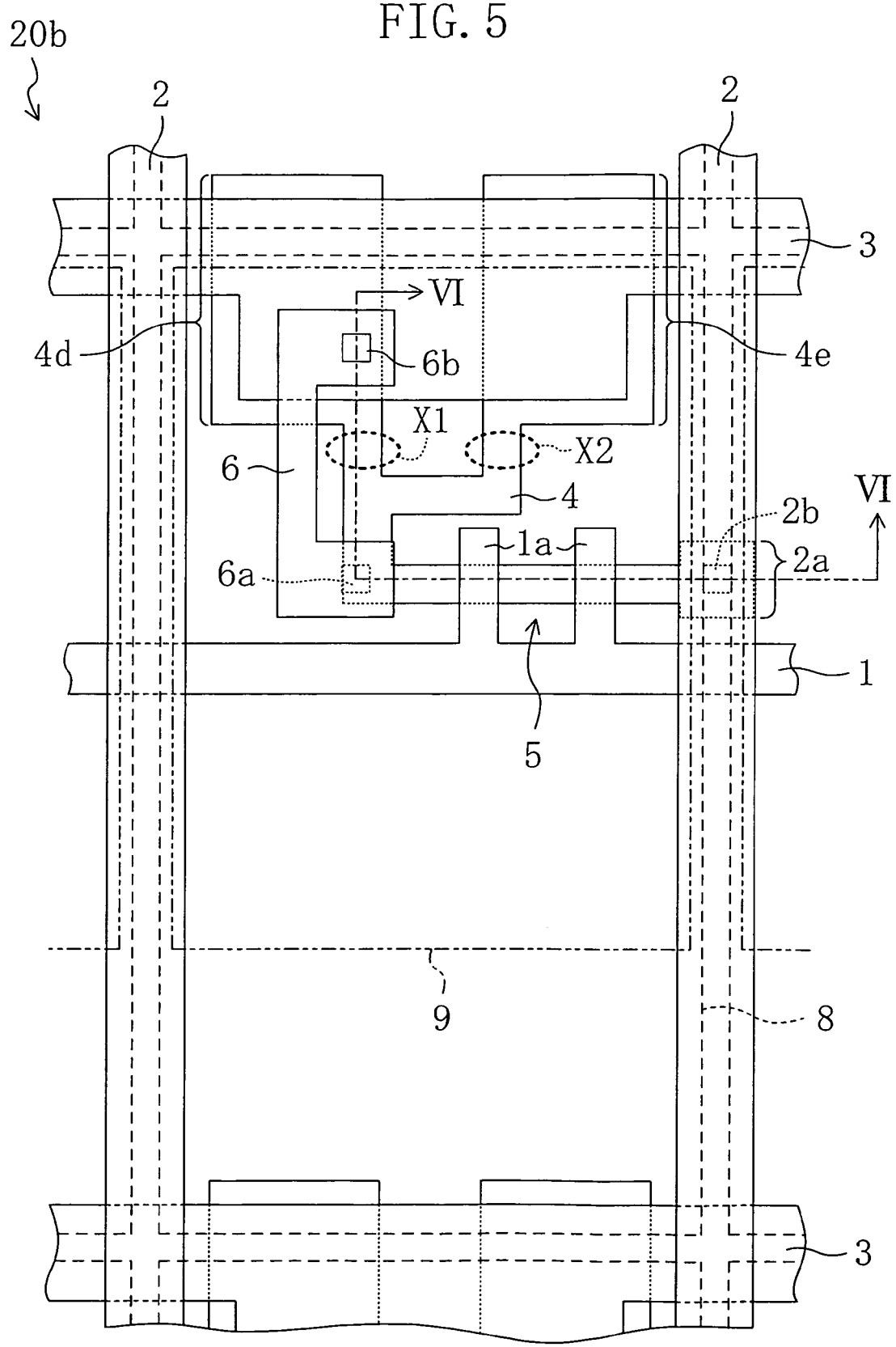
FIG. 5 is a cross-sectional view schematically illustrating an active matrix substrate 20b according to Embodiment 2 of the present invention.
Figure 6:
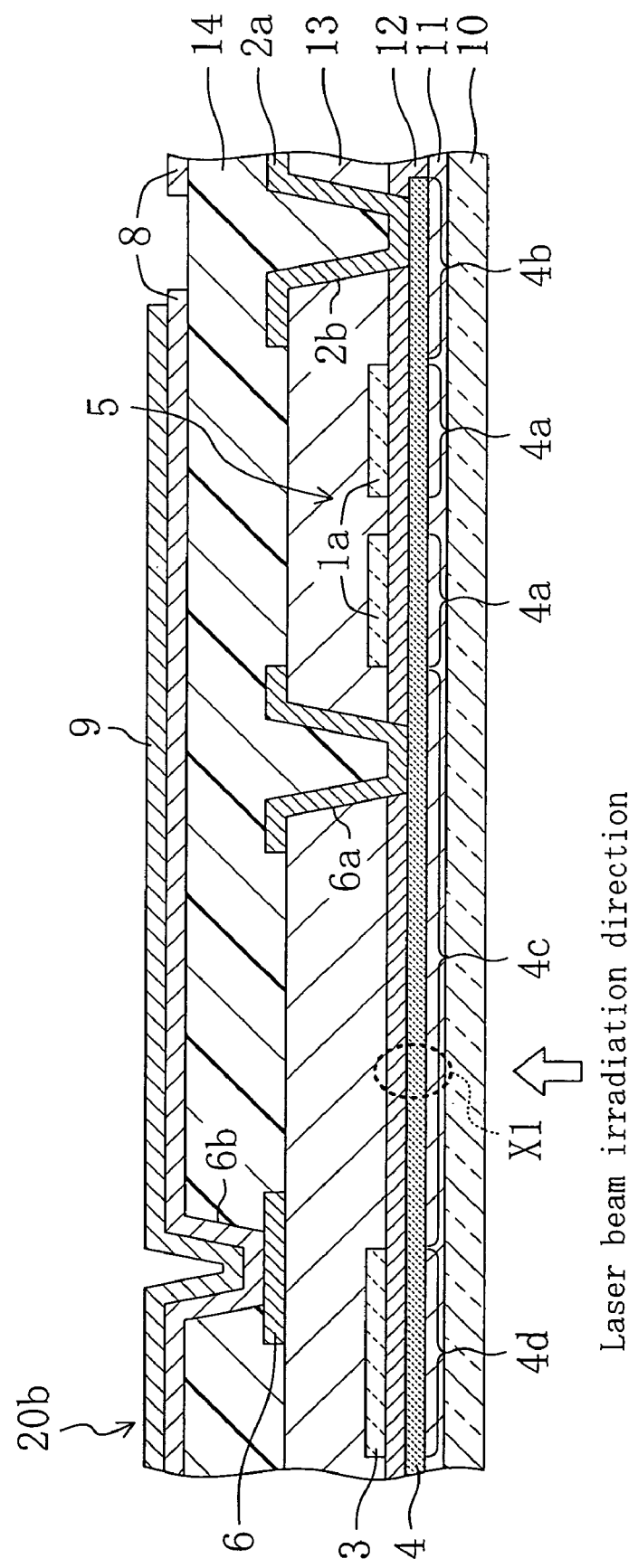
FIG. 6 is a cross-sectional view schematically illustrating the active matrix substrate 20b (before defect repair) of Embodiment 2 of the present invention and corresponds to a cross section taken along the line VI-VI of FIG. 5.

FIG. 5 is a plan view schematically illustrating an active matrix substrate 20b constituting a liquid crystal display device according to Embodiment 2. FIG. 6 is a cross-sectional view schematically illustrating the active matrix substrate 20b and corresponds to a cross section taken along the line VI-VI of FIG. 5.

The liquid crystal display device includes the active matrix substrate 20b, a counter substrate provided so as to be opposed to the active matrix substrate 20b, and a liquid crystal layer provided so as to be interposed between the substrates.

The active matrix substrate 20b is so configured that the structure of a lamination film including films from a base coating film 11 through a pixel electrode 8 is substantially the same as the structure of the lamination film of the active matrix substrate 20a of Embodiment 1 and a reflection electrode 9 is provided over the pixel electrode 8 so as to cover the TFT 5. An alignment film 17 is provided so as to cover the pixel electrode 8 and the reflection electrode 9.

The reflection electrode 9 overlaps with part of the pixel electrode 8 accounting for about 70% of the whole area of the pixel electrode 8 to form a reflection region. The rest of the pixel electrode 8 which accounts for about 30% of the whole area and does not overlap with the reflection electrode 9 forms a transparent region.

For a counter substrate and a liquid crystal layer, substantially the same counter substrate and liquid crystal layer as those of Embodiment 1 are provided, and therefore detailed description thereof will be omitted.

The liquid crystal display device is so configured that in each pixel, predetermined electric charges are written in the pixel electrode 8 and the reflection electrode 9 and a potential difference is generated between the pixel electrode 8, the reflection electrode 9 a common electrode 18, so that a predetermined voltage is applied to each of a liquid crystal capacitor made of a liquid crystal layer 40 and auxiliary capacitors. Then, a transmittance of incident light from the outside is adjusted by using change in an alignment state of liquid crystal molecules which according to the level of the applied voltage, whereby an image is displayed. In this case, in the reflection region, incident light entering from the outside through the counter substrate is reflected, and in the transparent region, incident light entering from the outside through the active matrix substrate 20b is transmitted, so that an image is displayed.

Moreover, the reflection electrode 9 is provided so as to cover the TFT 5 and functions as a light shielding film for shielding incident light entering the TFT 5. Also, a limited space of the pixel as the reflection region is effectively utilized, and thus reduction in an aperture ratio can be suppressed.

Next, a method for forming the active matrix substrate 20b constituting the liquid crystal display device of the present invention will be partially described.

First, based on the method for forming the active matrix 20a of Embodiment 1, an active matrix substrate 20a is prepared.

Next, a molybdenum film (having a thickness of about 100 nm) and an aluminum film (having a thickness of about 150 nm) are formed by sputtering over pixel electrodes 8 of the active matrix substrate 20a. Then, a reflection electrode 9 is formed through pattern formation by the PEP technology.

In the above-described manner, the active matrix substrate 20b can be formed. Furthermore, after formation of the active matrix substrate 20b, a thin film of polyimide base resin is formed by printing, and then alignment treatment is performed to a surface of the polyimide base resin thin film to form an alignment film 17.

Next, a defect repair method for the liquid crystal display device of Embodiment 2 of the present invention will be described.

Figure 7:
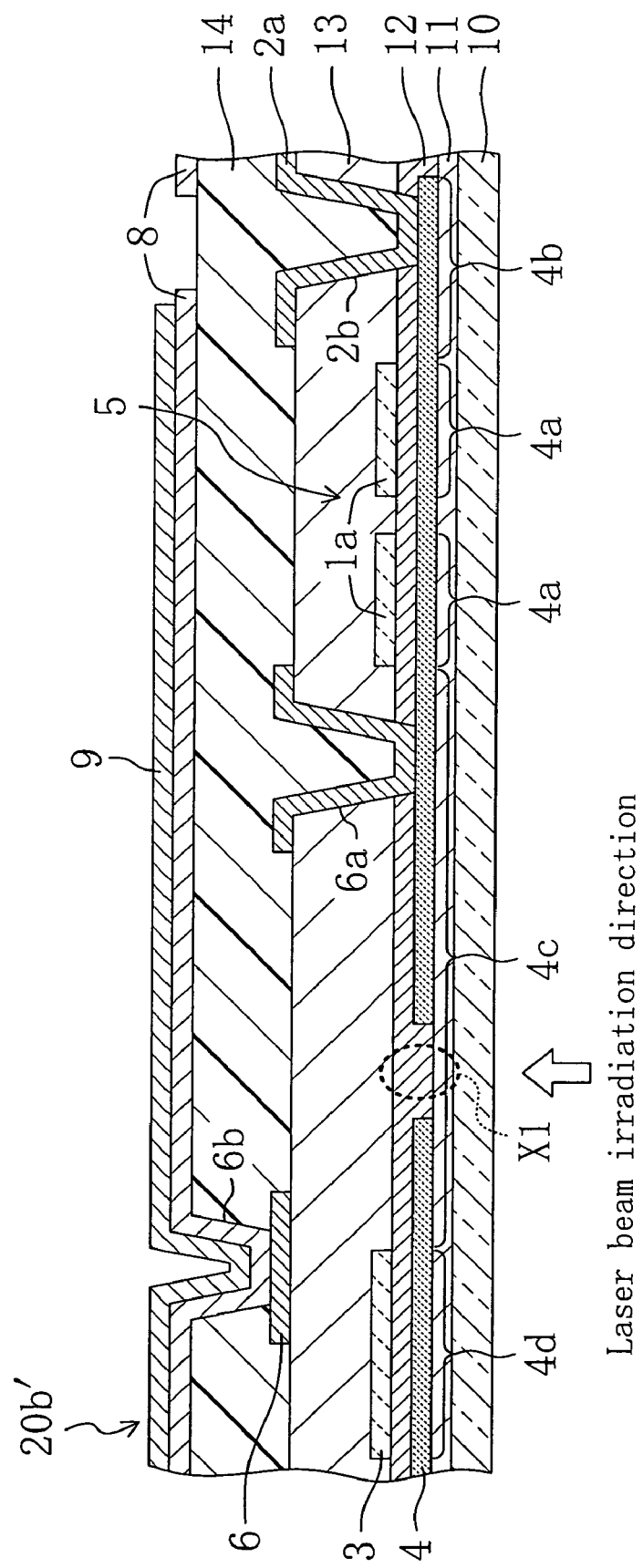
FIG. 7 is a cross-sectional view schematically illustrating an active matrix substrate 20b' (after defect repair) of Embodiment 2 of the present invention and corresponds to the schematic cross sectional view of FIG. 6.

FIG. 7 is a cross-sectional view schematically illustrating an active matrix substrate 20b' after defect repair and corresponds to the schematic cross-sectional view of FIG. 6.

In FIG. 7, laser beam is irradiated to a cutoff portion X1 from a side thereof closer to the glass substrate 10, so that a drain electrode 4c and a first auxiliary capacitor electrode 4d of a semiconductor film 4 are cut off.

The defect repair method for a liquid crystal display device is the same as that of Embodiment. Also, effects of the method are the same as those of Embodiment 1, and therefore detailed description thereof will be omitted.

In this embodiment, a semitransparent liquid crystal display device including a reflection region and a transparent region in a pixel has been described as an example. However, the present invention may be directed to a reflective liquid display device including an entire display region in a pixel serving as a reflection region. In that case, the pixel electrode 8 made of ITO may be replaced with a reflection electrode 9 made of an aluminum film.

Embodiment 3

According to the present invention, for the structure of Embodiment 1, the following structure may be used.

Figure 8:
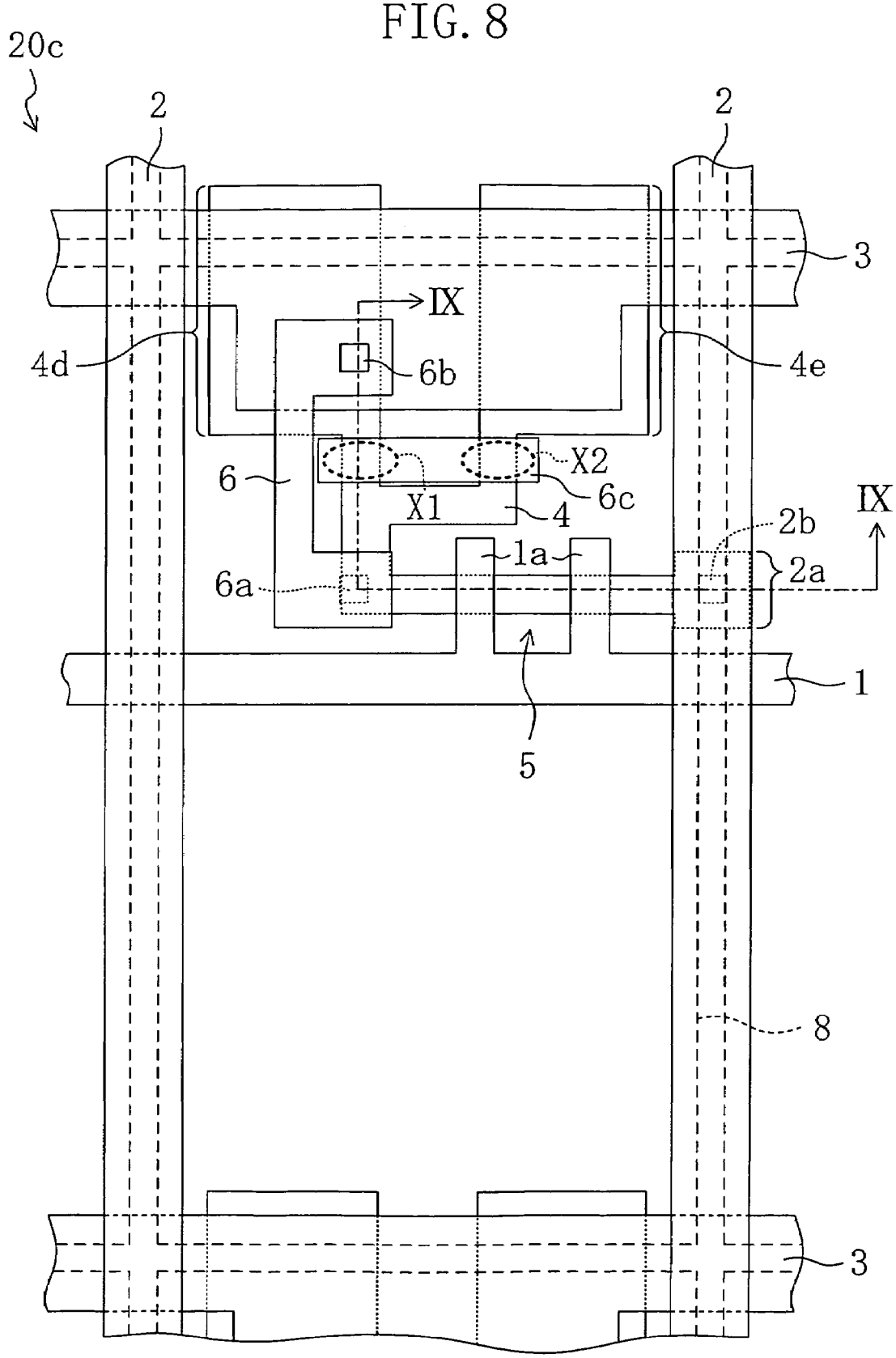
FIG. 8 is a plan view schematically illustrating an active matrix substrate 20c according to Embodiment 3 of the present invention.
Figure 9:
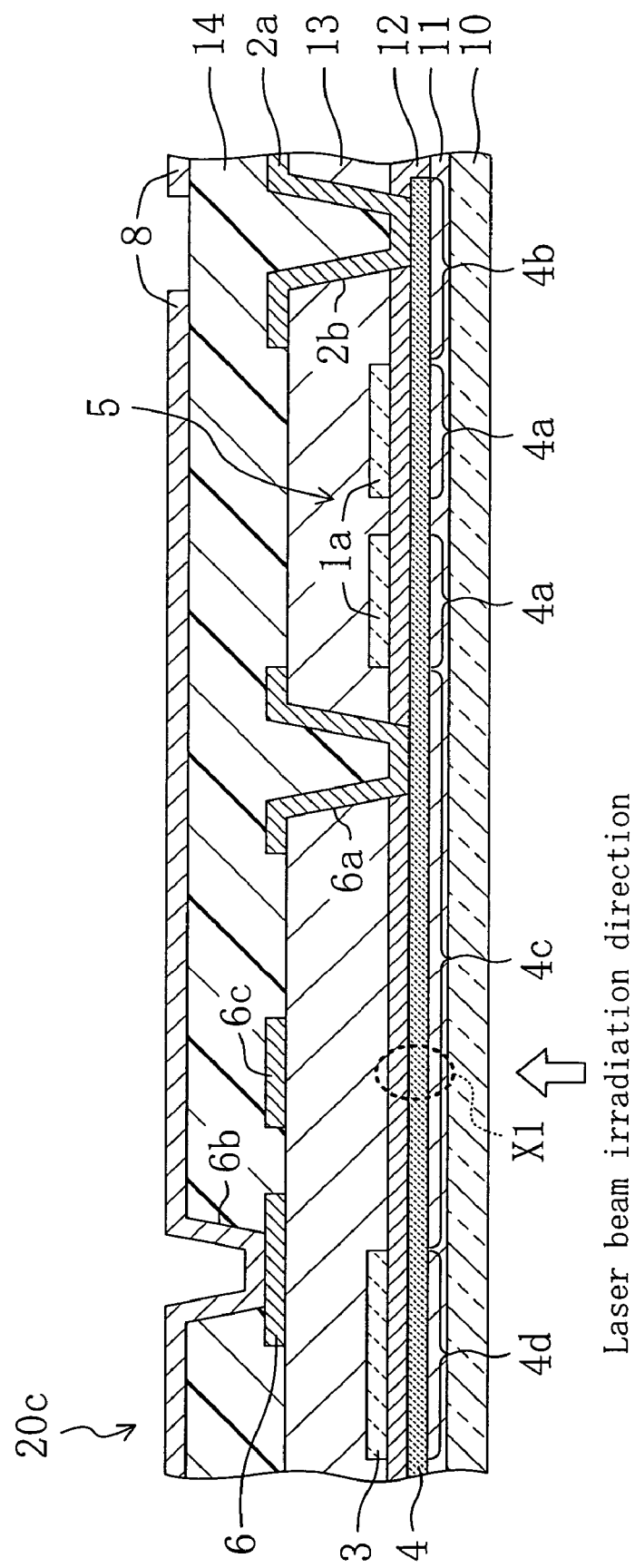
FIG. 9 is a cross-sectional view schematically illustrating the active matrix substrate 20c (before defect repair) of Embodiment 3 of the present invention and corresponds to a cross section taken along the line IX-IX of FIG. 8.

FIG. 8 is a plan view schematically illustrating an active matrix substrate 20c constituting a liquid crystal display device according to Embodiment 3. FIG. 9 is a cross-sectional view schematically illustrating the active matrix substrate 20c and corresponds to a cross section taken along the line IX-IX of FIG. 8.

The liquid crystal display device includes an active matrix substrate 20c, a counter substrate provided so as to be opposed to the active matrix substrate 20c, and a liquid crystal layer provided so as to be interposed between the substrates.

The active matrix substrate 20c has substantially the same structure as the structure of the active matrix substrate 20a of Embodiment 1 except that a protection layer 6c of the same material as that for a source line 2 is provided in the same layer in which the source line 2 is provided. The protection film 6c is provided between a connection portion (a semiconductor film 4) and a pixel electrode 8 so as to overlap with the connection portion, specifically, in the normal direction of the active matrix substrate 20c to each of cutoff portions X1 and X2 to which laser beam is irradiated.

For a counter substrate and a liquid crystal layer, substantially the same counter substrate and liquid crystal layer as those of Embodiment 1 and 2 are used, and therefore detailed description thereof will be omitted. Moreover, as for a method for forming an active matrix substrate 20c, the shape of a pattern used in pattern formation to form the source electrode extended electrode 2, the source line 2 and the drain electrode extended electrode 6 in the method for forming an active matrix substrate described in Embodiment 1 can be changed, and therefore detailed description thereof will be omitted.

Next, a defect repair method for a liquid crystal display device according to Embodiment 3 of the present invention will be described.

Figure 10:
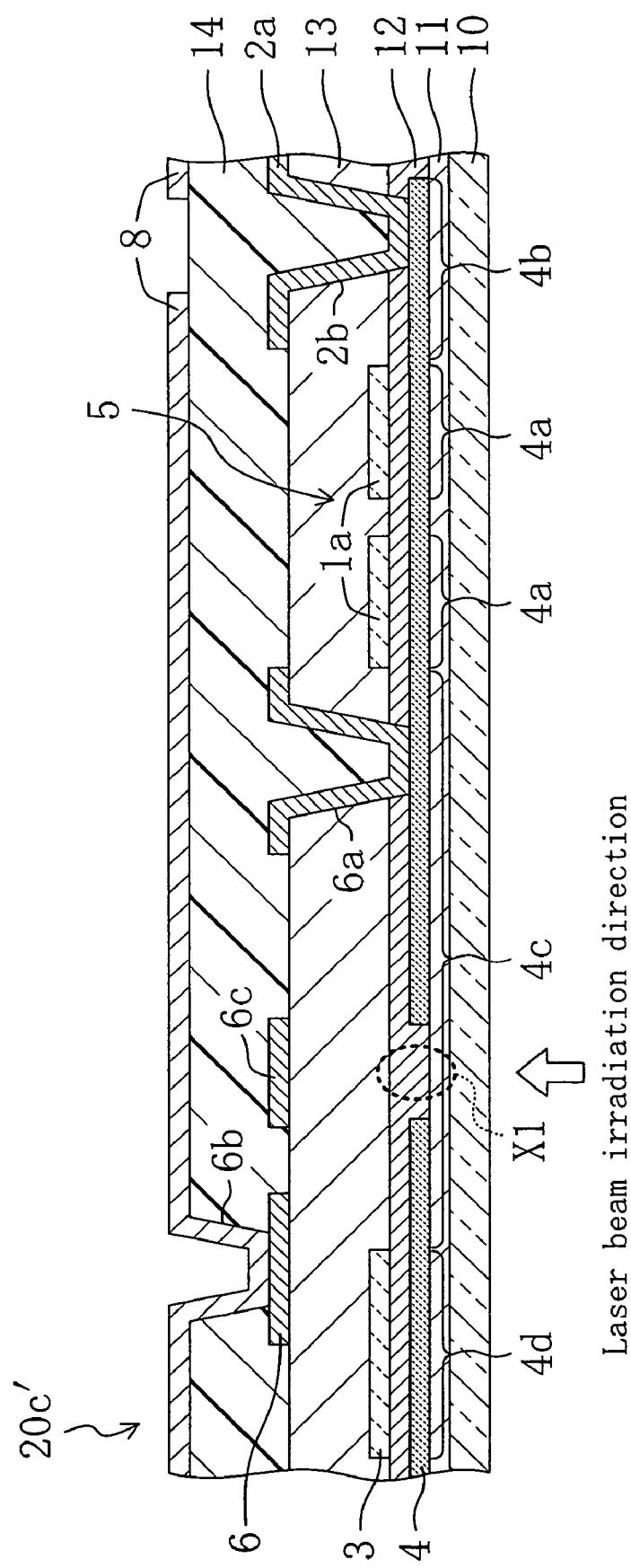
FIG. 10 is a cross-sectional view schematically illustrating an active matrix substrate 20c' (after defect repair) according to Embodiment 3 of the present invention and corresponds to the schematic cross-sectional view of FIG. 9.

FIG. 10 is a cross-sectional view schematically illustrating an active matrix substrate 20c' after defect repair and corresponds to the schematic cross-sectional view of FIG. 9.

In FIG. 10, laser beam is irradiated to a cutoff portion X1 from a side thereof closer to a glass substrate 10, so that a drain electrode 4c and a first auxiliary capacitor electrode 4d of a semiconductor film 4 are cut off.

The defect repair method for a liquid crystal display device and effects of the method are the same as those of Embodiment 1. However, with a protection layer 6c provided so as to overlap with a connection portion, damages given to the pixel electrode can be reduced by the protection layer 6c when laser beam is irradiated to the connection portion from part thereof closer to the gate electrodes 1a, i.e., part thereof closer to the insulation substrate 10. Moreover, the protection layer 6c is provided in a region to which laser beam that has missed the connection portion as an irradiation target might be irradiated by mistake. Thus, even if irradiated laser beam misses the connection portion, the laser beam is shielded by the protection layer 6c, so that peripheral members (the pixel electrode 8, the alignment film, the liquid crystal layer and the like) are less damaged.

In this case, when damages to the pixel electrode 8, the alignment film, the liquid crystal layer and the like by laser beam occur, the damages become small luminescent spots or black points in displaying an image. This might cause reduction in display quality. However, in the active matrix substrate 20c constituting a display device according to the present invention, the protection layer 6c for preventing damages by laser beam is provided, and thus a connection portion can be cut off in a simple manner without damaging other members in the vicinity of a laser irradiation part.

In this embodiment, the protection layer 6c is applied to the active matrix substrate 20a described in Embodiment 1. However, the protection layer 6c may be applied to the active matrix substrate 20b described in Embodiment 2

Moreover, in this embodiment, the protection layer 6c formed of the same material as that for the source line 2 in the same layer in which the source line 2 is described as an example. However, a protection layer may be formed of the same layer of which the gate line 1, the gate electrode 1a and the capacitor line 3 are formed. Therefore, the protection layer 6c can be formed between each connection portion and the pixel electrode 8 without adding an additional process step.

Note that the protection layer 6c only has to be provided so as to be closer to the liquid crystal layer than the semiconductor film 4. The protection layer 6c may be provided not only in the same layer including a source layer in which the source line 2, the source electrode extended electrode 2a and the drain electrode extended electrode 6 are formed and a gate layer in which the gate line 1, the gate electrode 1a and the capacitor line 3 are formed, as has been described, but also, with an additional process step added, in some other layer than the source layer and the gate layer Embodiment 4

According to the present invention, for the structure of Embodiment 1, the following structure may be used.

Figure 11:
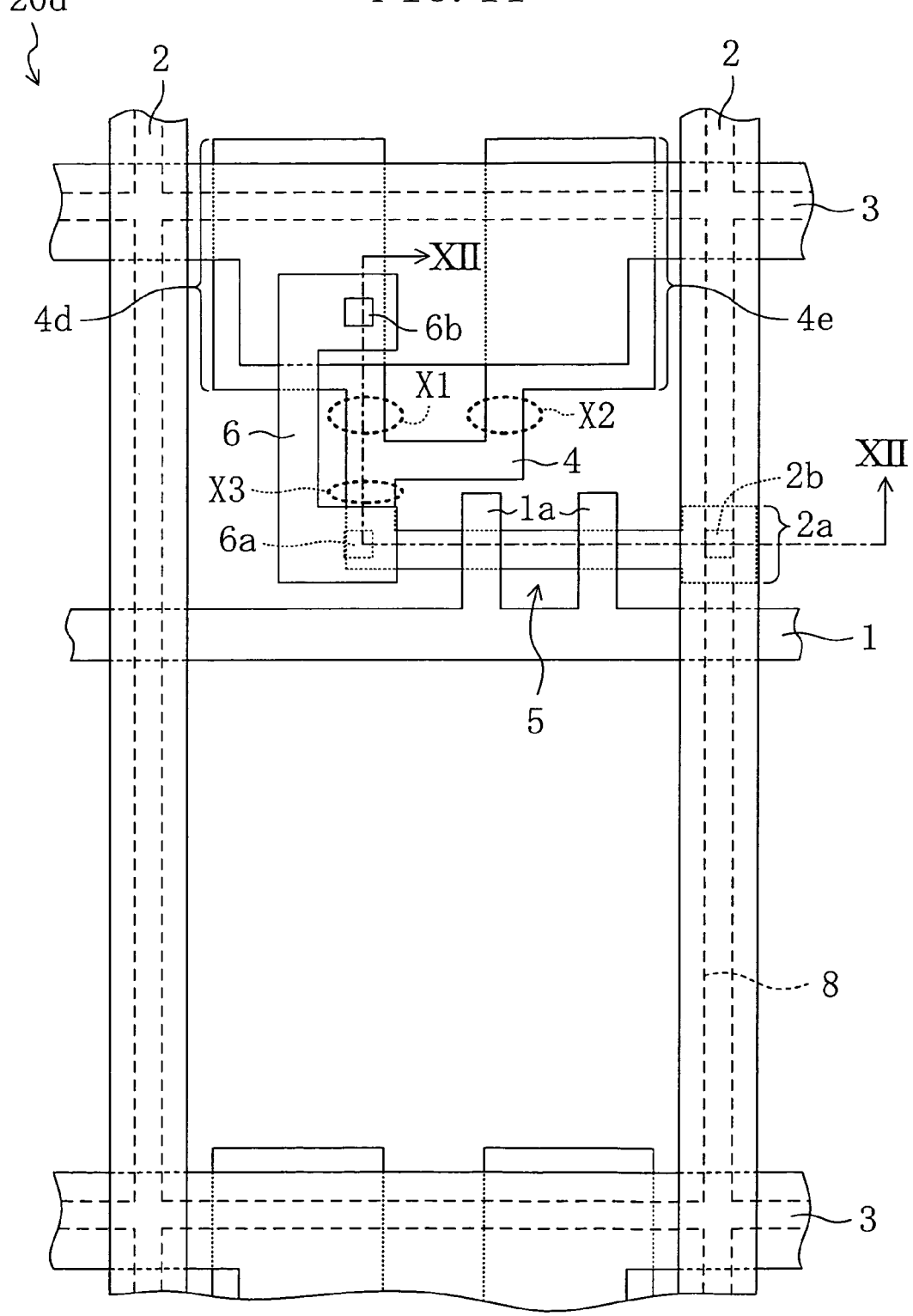
FIG. 11 is a plan view schematically illustrating an active matrix substrate 20d according to Embodiment 4 of the present invention.
Figure 12:
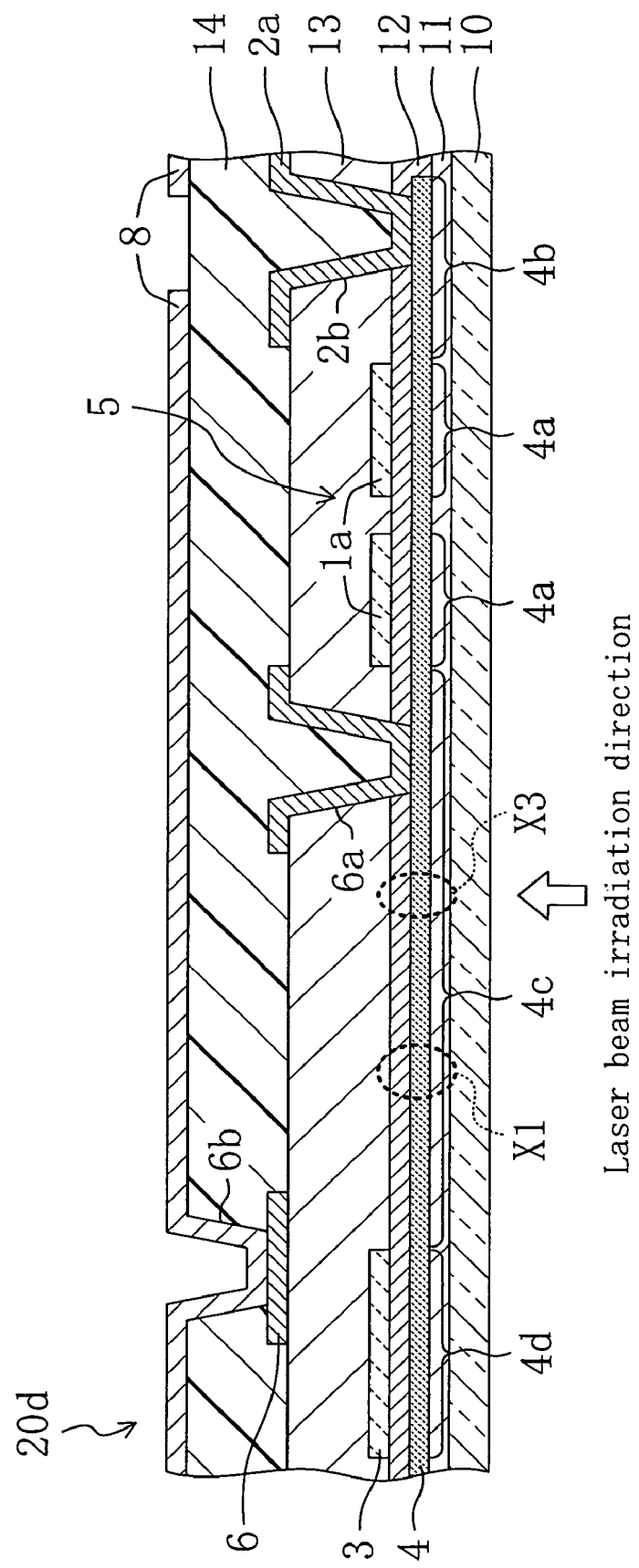
FIG. 12 is a cross-sectional view schematically illustrating the active matrix substrate 20d (before defect repair) of Embodiment 4 of the present invention and corresponds to a cross section taken along the line XII-XII of FIG. 11.

FIG. 11 is a plan view schematically illustrating an active matrix substrate 20d constituting a liquid crystal display device according to Embodiment 4. FIG. 12 is a cross-sectional view schematically illustrating the active matrix substrate 20d and corresponds to a cross section taken along the line XII-XII of FIG. 11.

The liquid crystal display device includes an active matrix substrate 20d, a counter substrate provided so as to be opposed to the active matrix substrate 20d, and a liquid crystal layer provided so as to be interposed between the substrates.

The structure of the active matrix substrate 20d is substantially the same as the structure of the active matrix substrate 20a of Embodiment 1 except that in addition to the cutoff portions X1 and X2, a cutoff portion X3 is provided. In this case, the connection portions described in Embodiment 1, Embodiment 2 and Embodiment 3 include a first connection section connected to the drain electrode 4c and second connection sections branched from the first connection section and connected to each of the auxiliary capacitor electrodes (4d and 4e). The first connection section corresponds to the cutoff portion X3 and the second connection sections corresponds to the cutoff portions X1 and X2, respectively.

A counter substrate, a liquid crystal layer, and a method for forming an active matrix substrate 20d are substantially the same as those of Embodiment 1, Embodiment 2 and Embodiment 3, and therefore detailed description thereof will be omitted.

Next, a defect repair method for a liquid crystal display device according to Embodiment 4 will be described.

In this embodiment, description will be given on the assumption that in any one of a plurality of pixels, a short circuit occurs between the capacitor line 3 and each of a first auxiliary electrode 4d and a second auxiliary capacitor electrode 4e, so that the first auxiliary capacitor electrode 4d and the second auxiliary capacitor electrode 4e can not be used.

Figure 13:
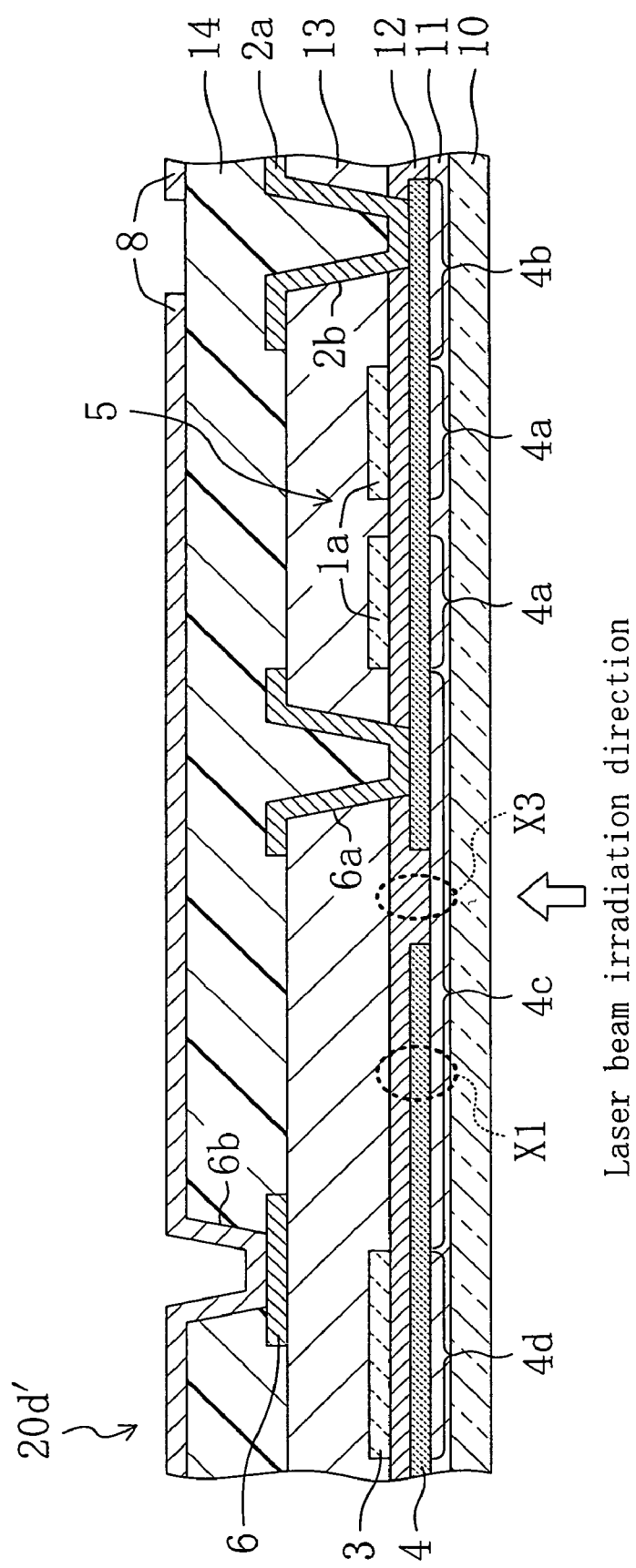
FIG. 13 is a cross-sectional view schematically illustrating an active matrix substrate 20d' (after defect repair) according to Embodiment 4 of the present invention.
Figure 14:
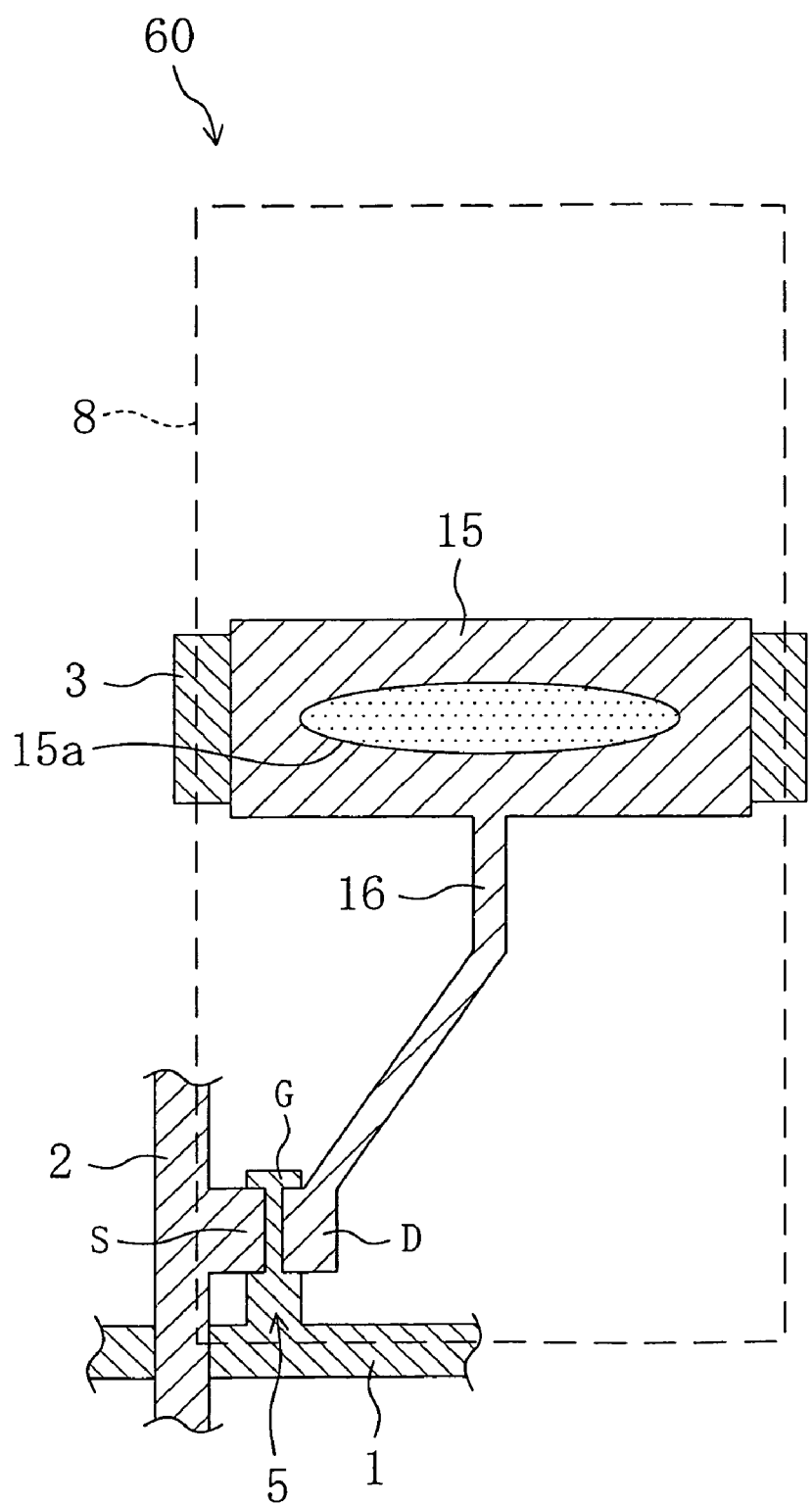
FIG. 14 is a cross-sectional view schematically illustrating an active matrix substrate 60 constituting a known liquid crystal display device.

FIG. 13 is a cross-sectional view schematically illustrating an active matrix substrate 20d' after defect repair and corresponds to the schematic cross-sectional view of FIG. 12.

In FIG. 13, laser beam is irradiated to the cut-off section X3 from part thereof closer to a glass substrate 10, so that a drain electrode 4c, a first auxiliary capacitor electrode 4d and a second capacitor electrode 4e are cut off.

According to the defect repair method for a liquid crystal display device, when a short circuit defect occurs in each of the auxiliary capacitor electrodes (4d and 4e), to remove all electrical connections with the drain electrode 4c corresponding to each of the auxiliary capacitor electrodes (4d and 4e), both of the second connection sections (cutoff portions X1 and X2) for connecting the drain electrode 4c and each of the auxiliary capacitor electrodes (4d and 4e) are not cut off, but only the first connection section (cutoff portion X3), i.e., the branch base of the second connection sections can be cut off. Thus, damages of an interconnect pattern in the vicinity of part to which laser beam is irradiated for cutoff can be reduced. Moreover, cut-off by laser beam is performed only once and thus the number of process steps required for defect repair is reduced. Furthermore, compared to the case where each of the cutoff portions X1 and X3 is cut off, damages of peripheral members (the pixel electrode 8, the alignment film, the liquid crystal layer and the like) can be reduced.

Thus, even when short circuit defects occur in all of auxiliary capacitor electrodes in a pixel and all of electrical connections with drain electrodes corresponding to the auxiliary capacitor electrodes has to be removed, a display state can be repaired to be in a nearly normal state by cutting off only the corresponding first connection section (cutoff portion X3).

Note that in this embodiment, the present invention is applied to the active matrix substrate 20a described in Embodiment 1. However, the present invention may be applied to the active matrix substrate 20b described in Embodiment 2 and the active matrix substrate 20c described in Embodiment 3.

As has been described, according to the present invention, a display failure due to a short circuit detect in an auxiliary capacitor electrode can be repaired in a simple manner. Therefore, the present invention is useful for liquid crystal display devices with interconnects and TFTs of which the size has been reduced more and more.

What is claimed is:

1. A display device comprising:
    a source line for supplying a display signal;
    a display pixel electrode; and
    a switching element for switching an electrical connection between the source line and the pixel electrode,
    wherein the switching element includes a source electrode electrically connected to the source line, a drain electrode electrically connected to the pixel electrode, and a gate electrode for controlling an electrical connection between the source electrode and the drain electrode,
    wherein the display device further includes a plurality of auxiliary capacitor electrodes connected to the drain electrode and connection portions are formed of a semiconductor material, each of the connection portions being provided between the drain electrode and each of the plurality of auxiliary capacitor electrodes.

2. The display device of claim 1, further comprising: an extended electrode electrically connected to the drain electrode,
    wherein each of the connection portions is formed so as to have a smaller thickness than the thickness of the extended electrode.

3. The display device of claim 1, wherein the drain electrode, the plurality of auxiliary capacitor electrodes, and the connection portions each of which is provided between the drain electrode and each of the plurality of auxiliary capacitor electrodes are formed in a same semiconductor film.

4. The display device of claim 1, wherein the switching element is provided on an insulation substrate, and
    wherein the connection portions are provided so as to be closer to the insulation substrate than to the gate electrode.

5. The display device of claim 1, wherein the connection portions and the pixel electrode are formed in different layers, and
    wherein a protection layer is provided between each of the connection portions and the pixel electrode so as to overlap with each of the connection portions.

6. The display device of claim 5, wherein the protection layer is formed of a material used for forming the source line or the gate electrode.

7. The display device of claim 1, wherein the connection portions include a first connection section and second connection sections, the first connection section being connected to the drain electrode, each of the second connection sections being branched from the first connection section and connected to each of the auxiliary capacitor electrodes.

8. A display device comprising:

a source line for supplying a display signal;
a display pixel electrode; and
a switching element for switching an electrical connection between the source line and the pixel electrode,
wherein the switching element includes a source electrode electrically connected to the source line, a drain electrode electrically connected to the pixel electrode, and a gate electrode for controlling an electrical connection between the source electrode and the drain electrode, and
wherein the display device further includes a plurality of auxiliary capacitor electrodes connected to the drain electrode, connection portions are formed of a semiconductor material, each of the connection portions being provided between the drain electrode and each of the plurality of auxiliary capacitor electrodes, and one of the connection portions is cut off.

9. A display device comprising:
a source line for supplying a display signal;
a display pixel electrode; and
a switching element for switching an electrical connection between the source line and the pixel electrode,
wherein the switching element includes a source electrode electrically connected to the source line, a drain electrode electrically connected to the pixel electrode, and a gate electrode for controlling an electrical connection between the source electrode and the drain electrode,
wherein the display device further includes a plurality of auxiliary capacitor electrodes connected to the drain electrode and connection portions are formed of a semiconductor material, each of the connection portions being provided between the drain electrode and each of the plurality of auxiliary capacitor electrodes,
wherein the connection portions include a first connection section and second connection sections, the first connection section being connected to the drain electrode, each of the second connection portions being branched from the first connection portion and connected to each of the auxiliary capacitor electrodes,
wherein the display device includes a plurality of pixels, each of the pixels being defined by the pixel electrode, and
wherein one of the pixels is a defective pixel due to a short circuit defect in the plurality of auxiliary capacitor electrodes, and in the defective pixel, the first connection section is cut off.

10. A method for fabricating a display device which includes a source line for supplying a display signal, a display pixel electrode, and a switching element for switching an electrical connection between the source line and the pixel electrode and in which the switching element includes a source electrode electrically connected to the source line, a drain electrode electrically connected to the pixel electrode, and a gate electrode for controlling an electrical connection between the source electrode and the drain electrode, the display device further includes a plurality of auxiliary capacitor electrodes connected to the drain electrode and connection portions are formed of a semiconductor material, each of the connection portions being provided between the drain electrode and each of the plurality of auxiliary capacitor electrodes, the method comprising:
a defect detection step of detecting from the plurality of auxiliary capacitor electrodes an auxiliary capacitor electrode in which a short circuit defect has occurred; and
a defect repair step of cutting a connection portion between the auxiliary capacitor electrode detected in the defect detection step and the drain electrode.

* * * * *